May 5, 1964  J. T. FALLON  3,131,918
REGENERATIVE FURNACES
Filed Feb. 8, 1962  11 Sheets—Sheet 1

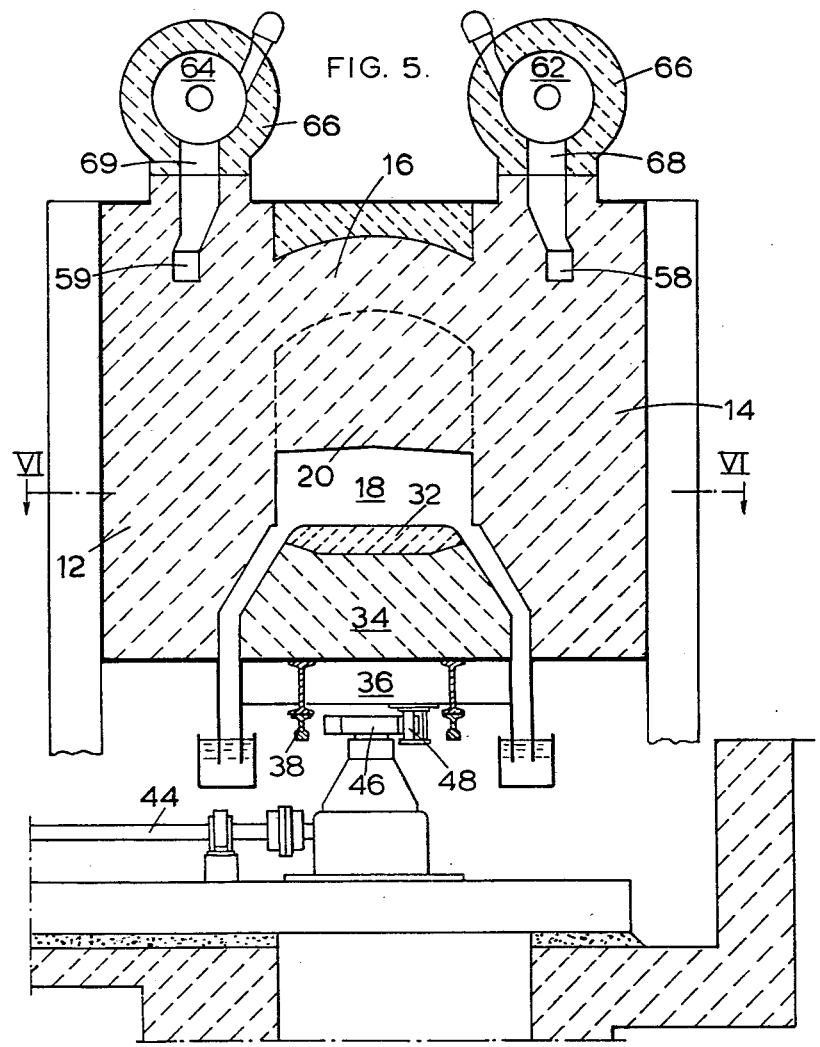

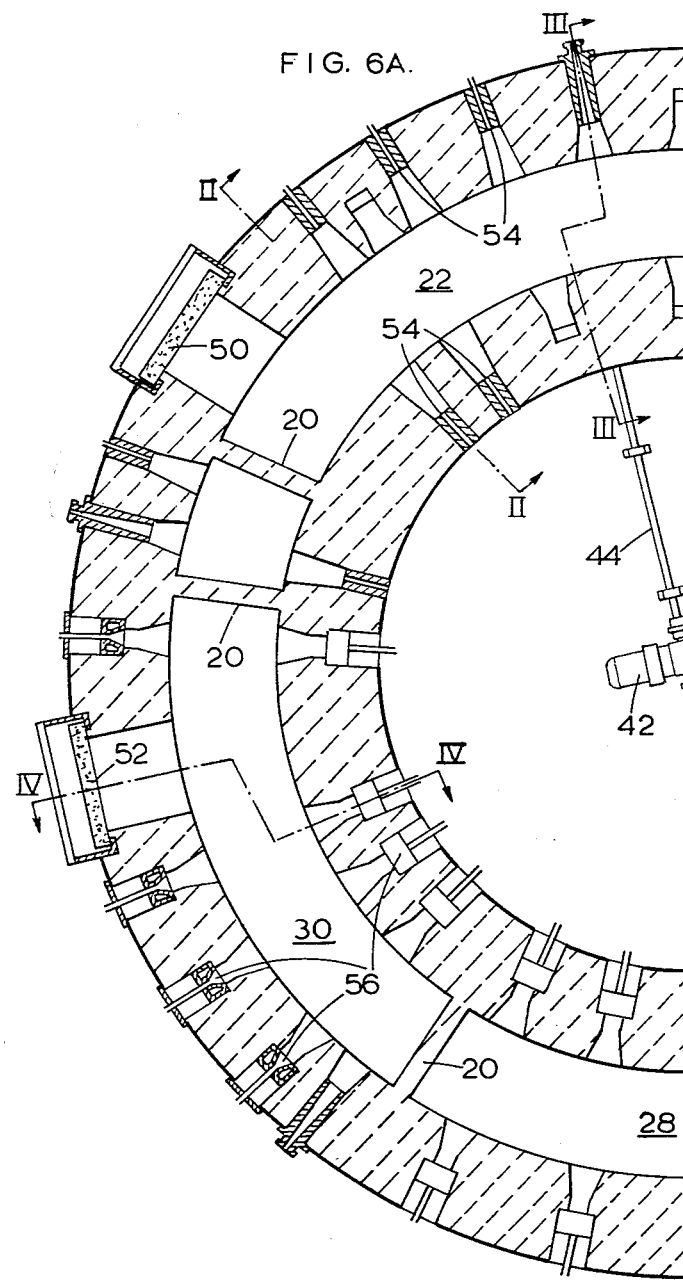

May 5, 1964 J. T. FALLON 3,131,918
REGENERATIVE FURNACES
Filed Feb. 8, 1962 11 Sheets-Sheet 11

INVENTOR
JOHN THOMAS FALLON
BY *McKinney & McKinney*
ATTYS.

United States Patent Office 3,131,918
Patented May 5, 1964

3,131,918
REGENERATIVE FURNACES
John Thomas Fallon, "Wulverle," 82 St. Bernard's Road, Olton, Birmingham 27, England
Filed Feb. 8, 1962, Ser. No. 171,891
10 Claims. (Cl. 263—15)

This invention relates to regenerative furnaces having two or more pairs of regenerators for heating the combustion air supplied to the fuel burners, and comprising means for reversing at regular time intervals the connections of the regenerators to the air supply and to the exhaust flue respectively.

The invention is especialy applicable to a regenerator system as described and illustrated in U.S.A. Patent No. 2,843,371 (in the name of the applicant) which includes controllable valve means for returning part of the cooled flue gas to the furnace outlet for recirculation through the heat-receiving regenerator, for diverting part of the air preheated by the heat-rejecting regenerator from the furnace inlet to the furnace outlet and for supplying cold air to the furnace outlet, to complete the combustion of incompletely burnt fuel, so as to adjust the proportions of cooled flue gas, of preheated air and of cold air supplied to the furnace outlet, in such a way as to regulate, simultaneously, the temperature and atmosphere in the furnace and the inlet temperature of the heat-receiving regenerator, without waste of calorific value of the fuel.

The main object of the present invention is the provision, for incorporation in very large metallurgical furnaces wherein the charge is continuously advanced through different zones of the furnace, in which different conditions of temperature and atmosphere are to be maintained, of an adjustable, automatic, electrical control device, common to two or more pairs of regenerators respectively associated with the said different zones, for regulating the reversals of said regenerator pairs either simultaneously or successively, according to a predetermined time sequence.

The furnace according to this invention is characterised in that different zones of the furnace, through which the charge is successively conveyed, are provided with separate pairs of regenerators whose valve means are independently controllable, to establish different conditions of atmosphere and temperature in the respective zones, and that the reversing valve means of the several regenerator pairs are electrically controlled by a common, automatic switching device which can be adjusted so that the flow-reversals of the different pairs of regenerators may be caused to take place either simultaneously or successively according to a selected time sequence.

The accompanying drawings illustrate, by way of example only, and without implied limitation of the scope of the invention as defined in the appended claims, one constructional embodiment of the invention.

In the drawings:

FIGURES 1A and 1B, taken together, are a plan view of a rotary hearth furnace;

FIGURES 2, 3, 4 and 5 are sectional elevations on the lines II—II, III—III, IV—IV and V—V respectively of FIGURE 6;

Figure 1A:
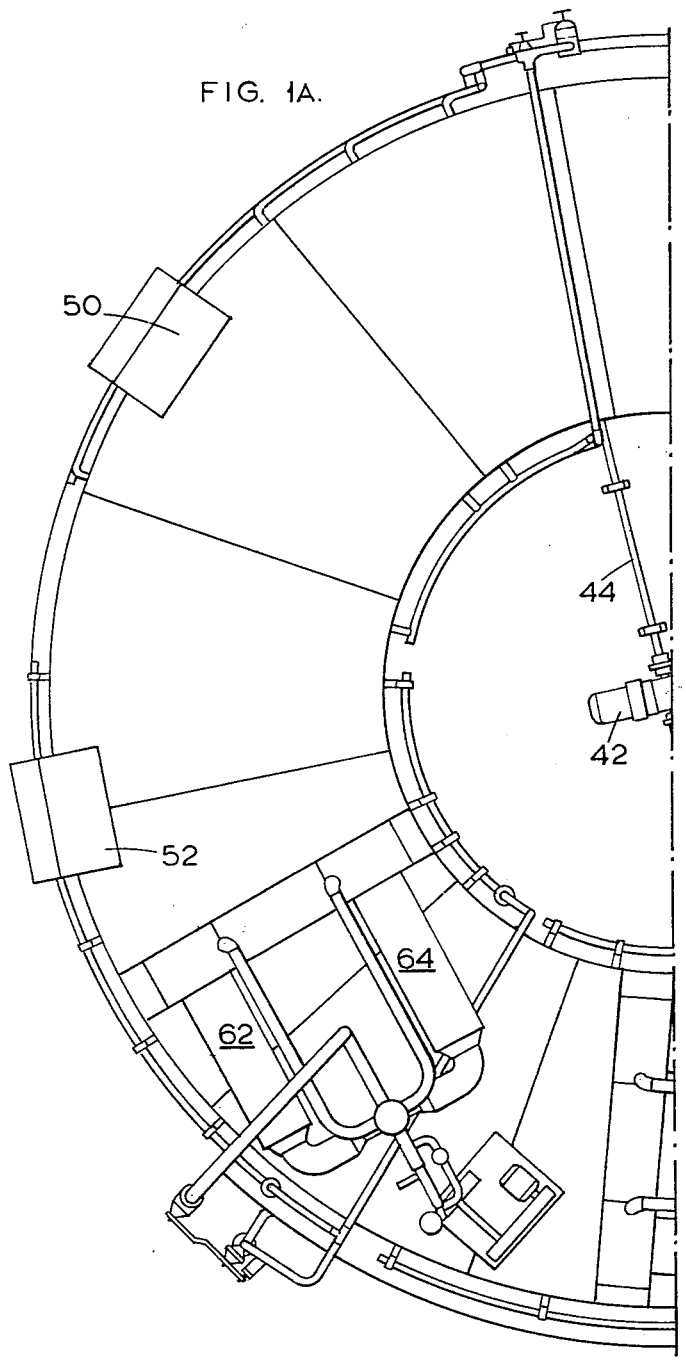
Figure 1B:
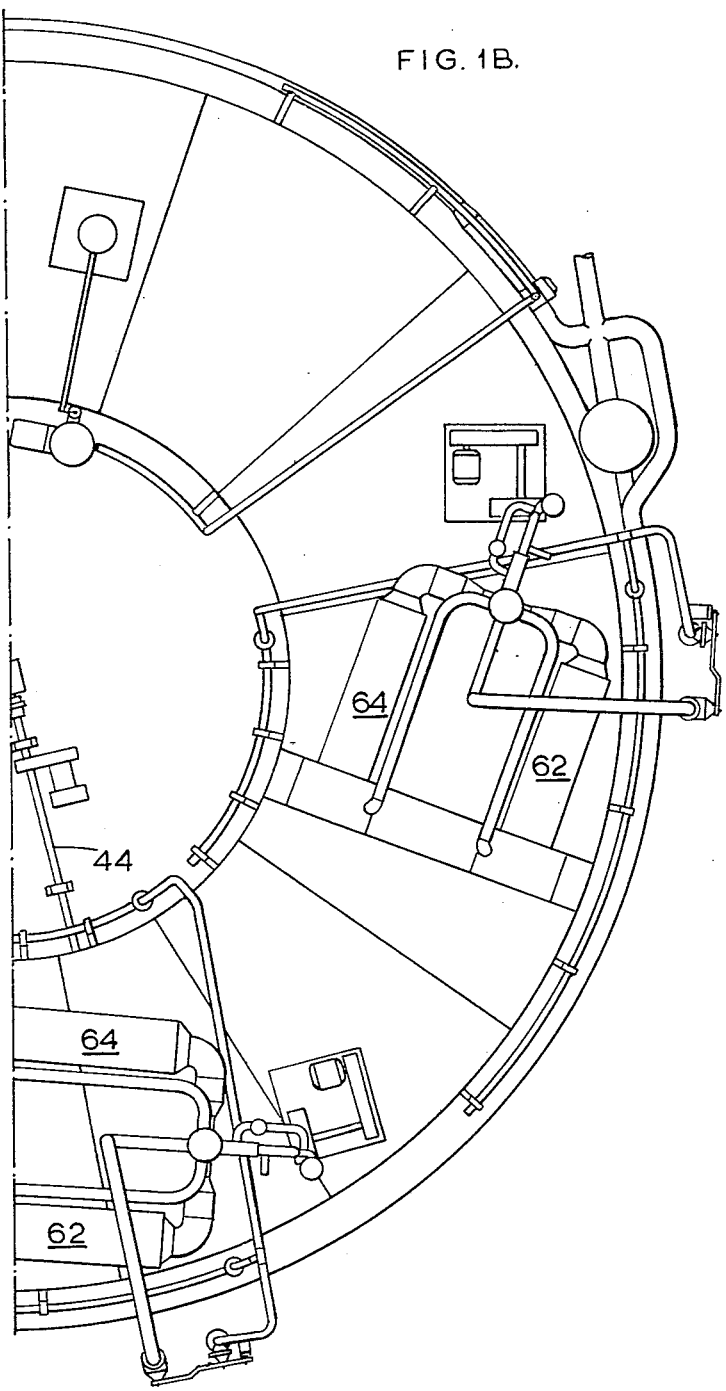
Figure 2:
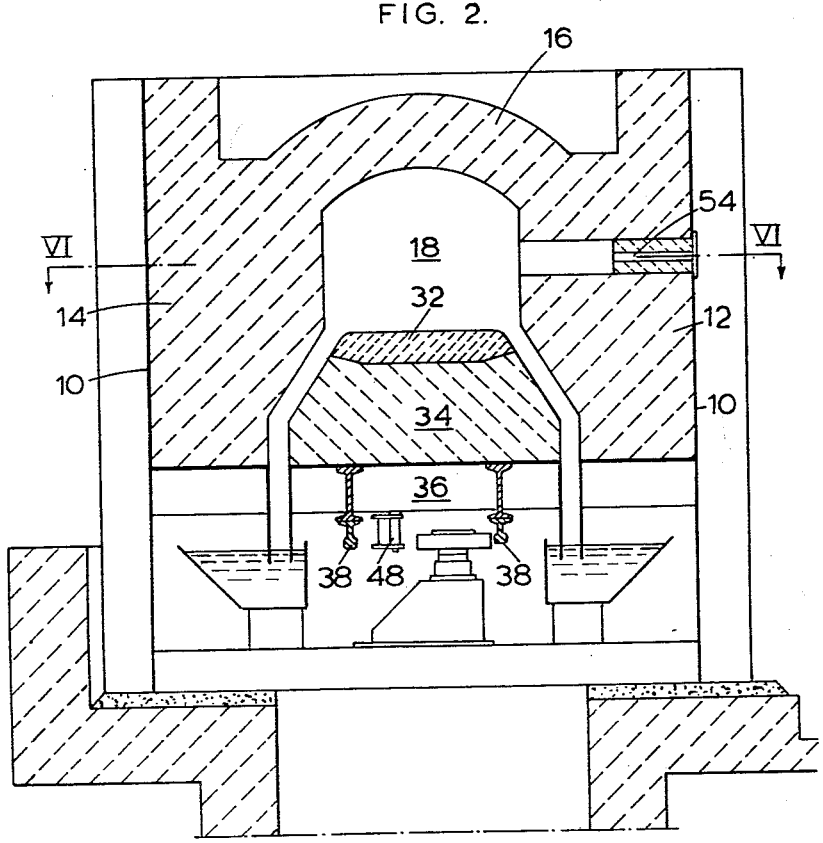
Figure 3:
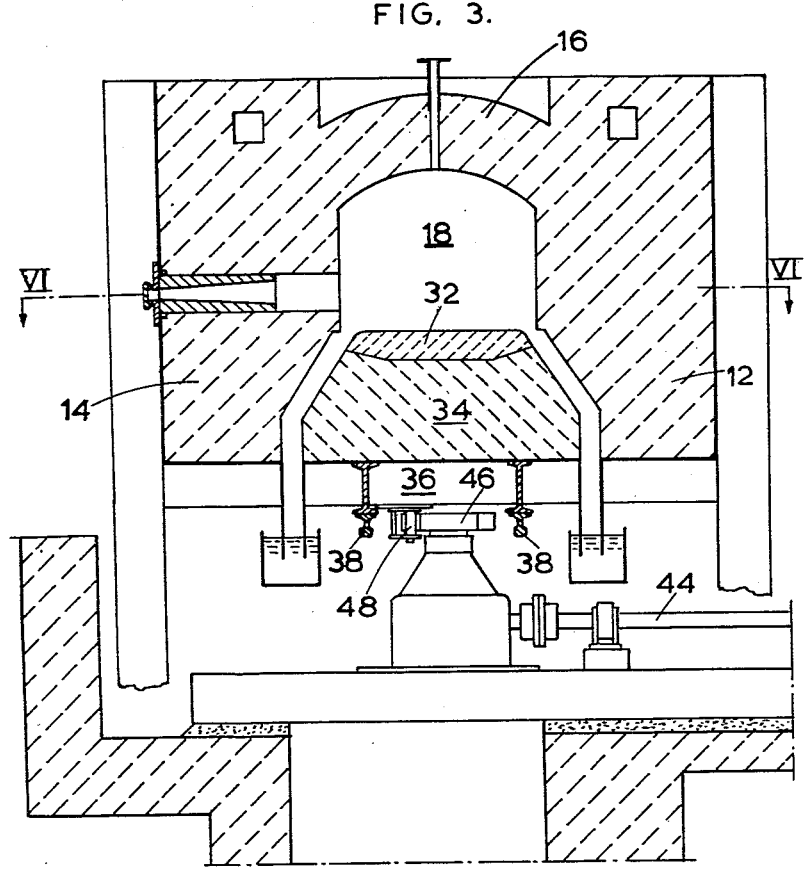
Figure 4:
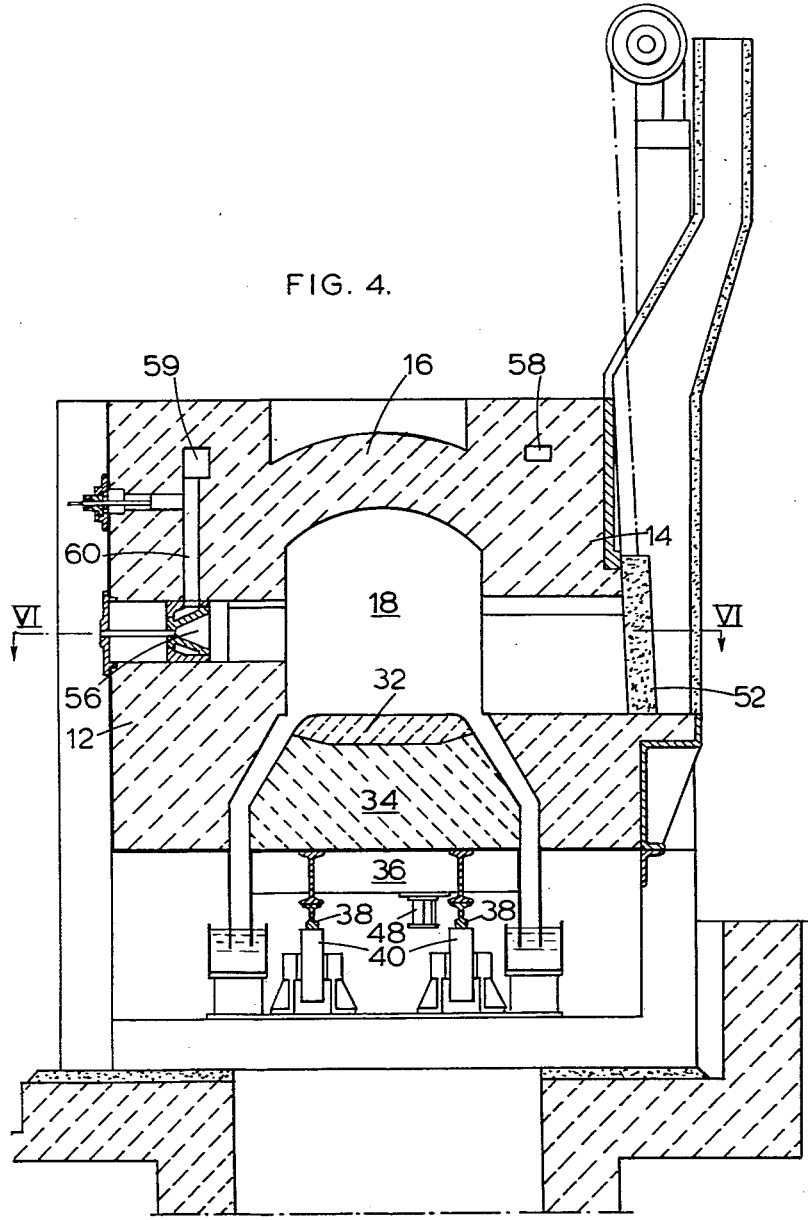
Figure 6B:
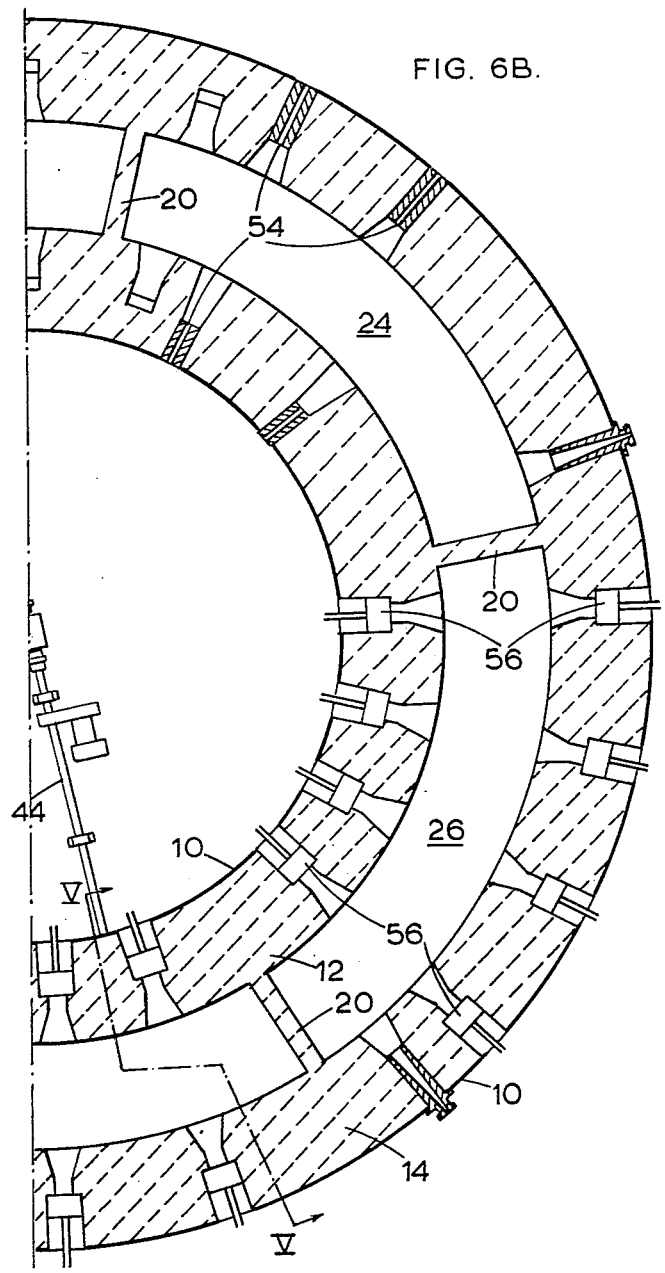
FIGURE 6 is a sectional plan on the line VI—VI of FIGURES 2 to 5.

The furnace illustrated in FIGURES 1 to 6 comprises an annular structure of refractory bricks supported by a steel casing 10 and having an inner wall 12, an outer wall 14 and a roof 16, together defining an annular chamber 18 subdivided by arches 20 into five successive zones 22, 24, 26, 28, 30. The floor of the chamber is constituted by the annular rotary hearth 32 of refractory material mounted on brickwork 34 supported on a steel frame 36 provided on its underside with rails 38, by which the hearth assembly is rotatively supported on rollers 40. A central motor 42 drives, through gearing and radial shafts 44, pinions 46 which engage a circular roller chain 48 mounted on the frame 36, thereby rotating the hearth 32 clockwise, as seen in FIGURE 6. The outer wall 14 of the chamber 18 has a charging door 50, through which the charge is fed into zone 22 by a charging machine (not illustrated) and a discharging door 52, through which the charge is extracted from zone 30.

As the hearth rotates, the charge is moved successively through zones 22 to 30. Zones 22 and 24 are preheating zones, the inner and outer walls of these zones being pierced by burners 54 fed with liquid or gaseous fuel and cold air. Zones 26 and 28 are heating zones and zone 30 a soaking zone. The inner and outer walls of the three latter zones are also provided with concentric type burners 56 which are fed with liquid or gaseous fuel and with regeneratively preheated air conveyed to the burners by ducts 58 (59) 60 formed in the brickwork of the outer and inner walls of the chamber. As hereinafter explained the ducts 58 (59) 60 also serve as outlets for the combustion products. Each burner is connected to a separate vertical duct 60 and the several ducts 60 in each wall of each zone are connected to a single horizontal duct 58 (or 59). Each zone 26, 28 and 30 has a duct 58 (or 59) in each of its walls, the ducts 58 (59) of adjacent zones not being interconnected.

A separate pair of regenerators 62, 64 is associated with each of zones 26, 28 and 30. The regenerators are cylindrical and comprise a refractory outer wall 66 containing a matrix (not illustrated) of refractory or metallic elements. Ducts 68 (69) connect the ducts 58 (59) with the interiors of the regenerators.

Figure 7:
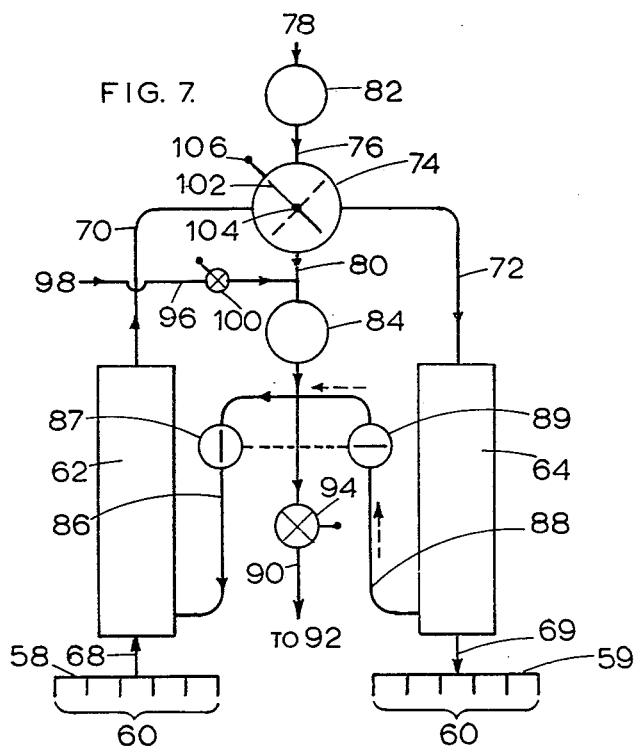
FIGURE 7 is a diagram of the air and gas connections of a pair of regenerators incorporated in the furnace of FIGURES 1 to 6.

The connections of the several regenerator pairs are alike and those of one such pair are diagrammatically illustrated in FIGURE 7.

One end of each regenerator 62 (64) communicates by the ducts 68 (69) with the furnace chamber. The other ends of the regenerators are connected by pipes 70 and 72 respectively with the reversing valve 74, which is connected by a pipe 76 with a main cold air inlet 78, and with an exhaust pipe 80. Pipe 76 includes a force-draught blower 82 and pipe 80 includes an exhaust blower 84, on the delivery side of which pipe 80 has three branches 86, 88, 90, of which branches 86 and 88 respectively communicate, through valves 87 and 89 with the ends of the regenerators connected to the furnace chamber through ducts 68, 69; and branch 90 communicates, through a proportioning valve 94 with the exhaust flue 92. Valves 87 and 89 are ganged to each other and to the reversing valve 74 by mechanical linkages (not illustrated) in such a way that when valve 74 is in the position shown, in which pipe 80 is connected to pipe 70 and pipe 76 to pipe 72 so that regenerator 62 is receiving heat and regenerator 64 is rejecting heat, valve 87 is open and valve 89 is closed. Similarly when the reversing valve 74 is thrown over valves 87 and 89 are thrown over likewise. However, the relative positions of valves 87, 89 can be independently adjusted by means, not illustrated, in such a way that neither valve closes completely, so that when valve 87 is fully open valve 89 is partially open to an extent regulated by the above-mentioned adjusting means, and conversely. In addition, a pipe 96 connects a secondary cold air inlet 98, through another proportioning valve 100, with the pipe 80 at a point between the reversing valve 74 and the exhaust blower 84. The proportioning valves 94 and 100 are independently controllable. The reversing valve 74 is interconnected with a reversing valve system for the fuel supply, as hereinafter described, and the fuel-flow is regulated by a conventional valve, not illustrated.

In the position shown in FIGURE 7, the main air supply is directed, through pipe 72, to regenerator 64, in which it is preheated and fed to the burners 56 of the inner wall 12 of the furnace chamber by ducts 69, 59. The cooled combustion products are evacuated by ducts 58, 68 into regenerator 62 through which they pass (rejecting heat) into pipe 70 and are expelled by blower 84 into the branches 86 and 90, branch 88 being closed by valve 89. The proportions received by branches 86 and 90 depend on the setting of valve 94. The cooled exhaust gas received by branch 86 is delivered to regenerator 62, valve 87 being open, and is recirculated through it, diluting the fresh, hot, combustion products entering the regenerator through duct 68. Valve 100 is closed, excluding entry of secondary cold air into regenerator. The recirculated, cooled, combustion products lower the temperature of the gases entering regenerator 62.

The atmosphere in the furnace chamber is regulated by controlling the fuel-flow rate. If a reducing atmosphere is needed, excess fuel is supplied. The combustion products then contain incompletely burnt fuel, principally in the form of $CO_2$ instead of $CO_2$. To recover the calorific value of such incompletely burnt residues, additional air is fed to the furnace outlet, either by partially opening the valve 100, so that cold air is added to the recirculated, cooled combustion products fed to the heat-receiving regenerator 62 by pipe 86, or by so adjusting the relative settings of the ganged valves 87, 89 that a proportion of air, preheated by the heat-rejecting regenerator 64, is fed to the entry of the heat-receiving regenerator 62; or by a combination of these methods. Evidently, by suitable adjustment of the proportioning valves 94 and 100 and of the ganged valves 87 and 89, the furnace atmosphere in the zone affected can be suitably regulated and at the same time the temperature of the gases entering the heat-receiving regenerator can be controlled so as not to overheat its matrix elements, without waste of calorific value of the fuel.

The reversing valve 74 is a simple butterfly valve having a butterfly vane 102 mounted on a shaft 104 carrying an external lever 106.

Figure 8:
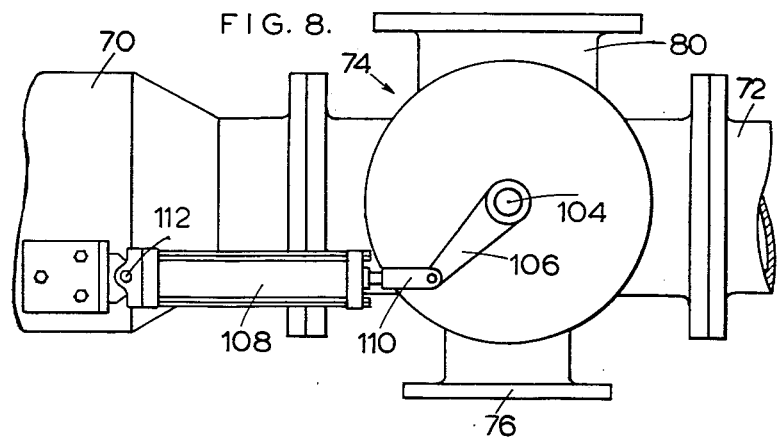
FIGURES 8 and 9 are front and rear elevations of the reversing valve of a pair of regenerators showing the operating and control mechanism (partly schematic)
Figure 9:
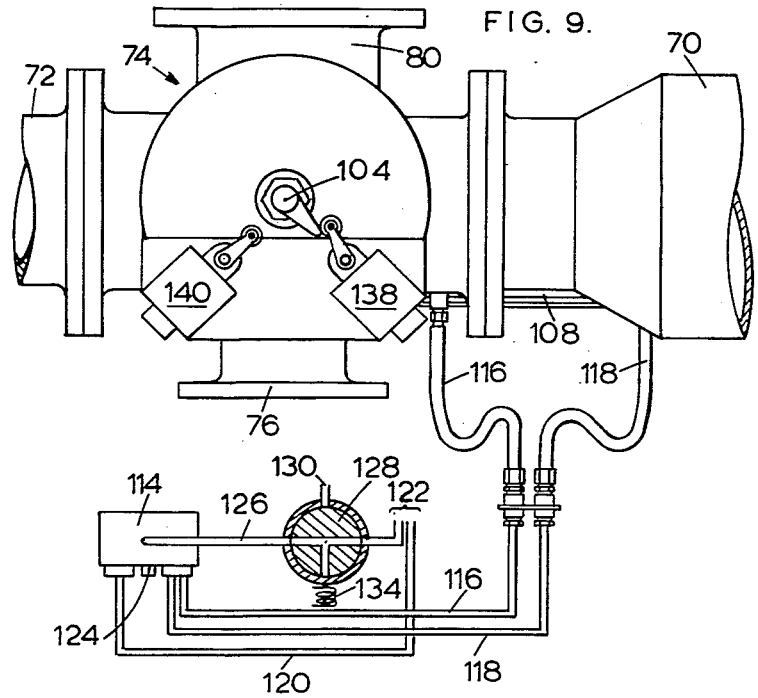

The lever 106 (see FIGURE 8) is pin-jointed to the piston rod 110 of a double-acting pneumatic cylinder 108 pivotally mounted at 112. The action of cylinder 108 is controlled by a piston-type valve 114 (see FIGURE 9) having five ports, of which two are respectively connected by lines 116, 118 with the opposed working chambers of cylinder 108, another by line 120 with the pneumatic pressure supply 122, the fourth port 124 being an exhaust port and the fifth being connected by a line 126 with one port of a three-ported, two position, selector valve 128, whose other two ports are respectively an exhaust port 130 and an inlet port connected to the pressure supply 122. In one selectable position of valve 128 the line 126 is under supply pressure, in the other line 126 is connected to exhaust. According to whether line 126 is pressurized or not, the piston 132 (which is pressure-balanced) of cylinder 108, takes up a position in which one of lines 116, 118 is pressurized and the other vented to exhaust, or conversely. Consequently, when valve 128 is moved from one selectable position to the other, the connections of the two regenerators 62, 64 to cold air supply and to exhaust are reversed by the reversing valve 74.

Valve 128 is operated by a rotary solenoid 134 (shown diagrammatically). When this solenoid is excited valve 128 is moved to one of its selectable positions and when the solenoid is not excited, the valve is moved to its other selectable position.

Figure 10:
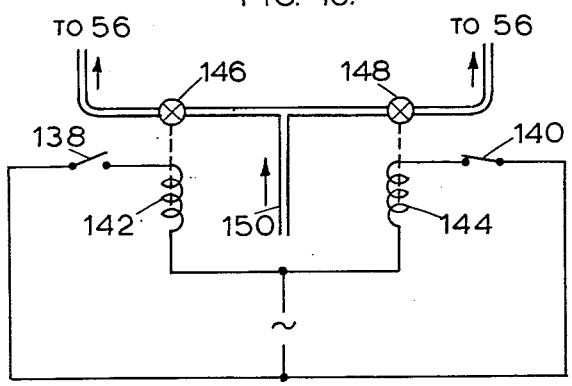
FIGURE 10 is a diagram of the fuel feed system of burners supplied with regeneratively heated air.

The opposite end of shaft 104 to that carrying lever 106 carries an external crank 136 actuating limit switches 138, 140, one or other of which is closed according to the selected position of valve 74. Switches 138, 140 control the excitation of solenoids 142, 144 (see FIGURE 10) actuating valves 146, 148 controlling admission of fuel from the main fuel supply line 150 to the burners 56 of the outer and inner walls respectively of the regeneratively heated zones 26, 28, 30, so that fuel is supplied only to those burners receiving regeneratively heated air.

Figure 11:
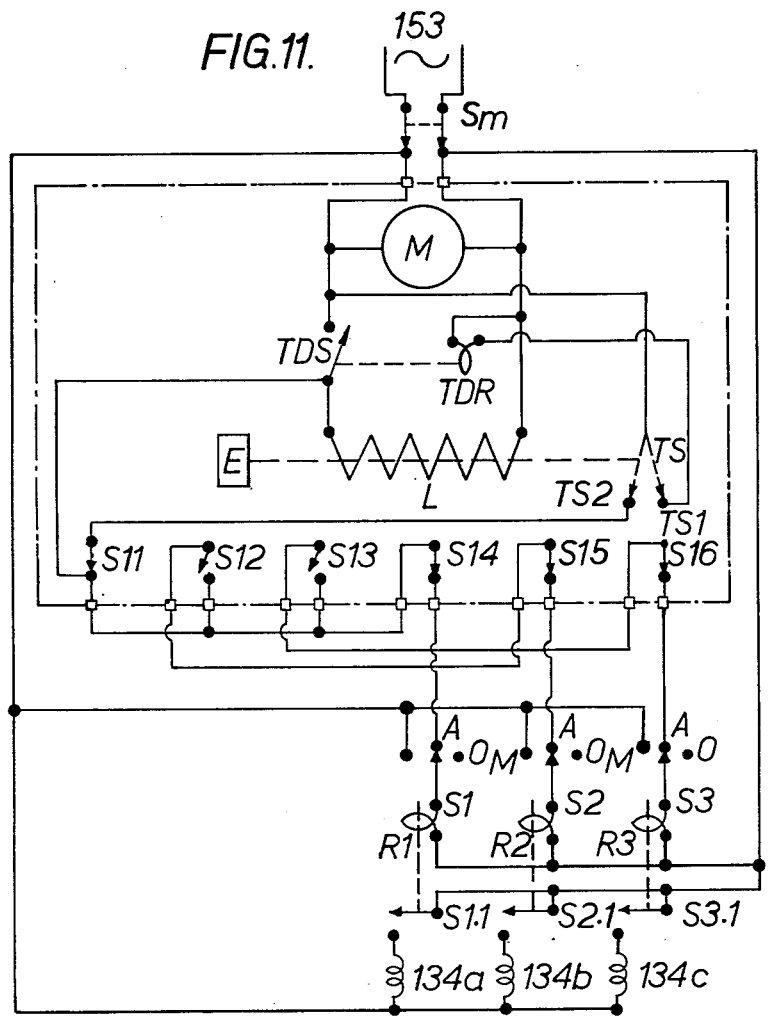
FIGURE 11 is a circuit diagram of an automatic electric switching device controlling the reversals of three pairs of regenerators incorporated in the furnace of FIGURES 1 to 6.
Figure 12:
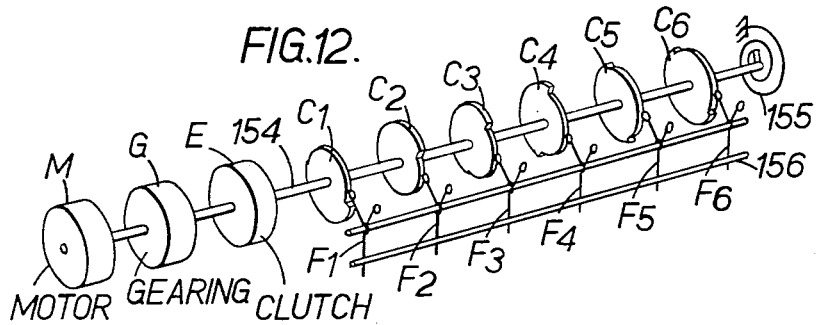
FIGURE 12 is a schematic view in perspective of the mechanical elements of the switching device.

The excitation of the solenoids 134 controlling the reversing valves 74 of all three regenerator pairs 62, 64 is controlled by a common, adjustable automatic switching device 152 (see FIGURES 11 and 12).

The solenoids 134 (denoted 134a, 134b and 134c in FIG. 11) of the three pairs of regenerators are controlled by switches S1.1, S2.1, S3.1 respectively operated by relays R1, R2, R3 (see FIGURE 11).

The circuit of FIGURE 11 is connectible, through a master switch Sm to a single-phase, A.C. source 153 of mains frequency. Relays R1, R2, R3 are bridged across this circuit through manually operable switches S1, S2, S3, respectively. Each of these switches has three positions, viz. "off" (O) isolating the associated relay, "manual" (M) connecting the associated relay directly across the mains and "automatic" (A) in which the excitation of the associated relay is controlled by the timing device.

In FIGURE 11, the switches S1, S2, S3 are shown in the automatic position, in which the excitation of each relay R1, R2, R3 is controlled by two switches in series, viz. for relay R1, switches S11, S14; for relay R2, switches S12, S15, and for relay R3, switches S13, S16. A further switch TS operated by the coil L has two fixed contacts TS1, TS2, of which contact TS2 is connected through switches S11, S14 to relay R1, through switches S11, S12, S15 to relay R2 and through switches S11, S13, S16 to relay R3. The connection of the other fixed contact TS1 will hereinafter be explained.

Switches S11 to S16 are actuated by cams of the timing mechanism as hereinafter explained. Normally, switches S11, S14, S15, S16 are closed, switches S12, S13 are open and switch TS closed on contact TS2, all as shown in FIGURE 11.

Referring now to FIGURE 12, the timing mechanism comprises a constant speed electric motor M, which drives, through reduction gearing G and an electromagnetic clutch E, a shaft 154 connected to a fixed anchorage by a clock-type spring 155. Clutch E is disengageable by spring means (not illustrated) and engageable by excitation of a coil L (see FIGURE 11). The motor M is connected across the mains through the master switch Sm so that when the latter is closed the motor runs continuously. Clutch coil L is excitable alternatively through contact TS2 of switch TS or through a delay switch TDS closable by a time delay relay TDR excitable through contact TS1 of switch TS (see FIGURE 11). Mounted on shaft 154 are six cams C1 to C6 which respectively actuate switches S11 to S16. The cams are not fixed to the shaft but are a tight friction fit thereon so that their relative positions on the shaft are adjustable, for which purpose each cam carries a graduated drum (not illustrated) readable against a fixed vernier plate (also not illustrated). The cams C1—C6 actuate the switches S11—S16 through cam follower rockers F1—F6 which are held in contact with the cams by spring means (not illustrated) when the clutch E is engaged, but when the clutch disengages it moves (by means not illustrated) a bar 156 to lift all the cam followers off their cams. At the same time switch TS is thrown over from contact TS2 to contact TS1.

In the rest position of the device, spring 155 is relaxed, but rotation of shaft 154 in the forward direction winds up the spring 155, which, on disengagement of the clutch E, returns the shaft 154 and its cams to the rest position. Since the return movement of the shaft 154 and its cams is liable to rebound, a delay is imposed after disengagement of the clutch before re-engagement thereof. This is effected by means of switch TS and the time delay relay TDR and switch TDS. As soon as the cam mechanism opens switch S11, the coil L is de-energised and the clutch is disengaged. This throws switch TS over from contact TS2 to contact TS1, thereby exciting the relay TDR which, after a few seconds' delay, closes switch TDS and thereby re-energises the coil L to re-engage the clutch. This delay enables the cam mechanism to settle down in its initial or rest position after being returned thereto by spring 155. Further, since during the delay period contact TS2 is out of circuit, all the lines connected to the cam-operated switches S11—S16 are dead and are not made live again until re-engagement of the clutch has returned switch TS to contact TS2, whereupon the relay TDR is de-energised and switch TDS reopened.

In the following explanation of the operation of the system, certain arbitrary assumptions will be made, by way of example only and mainly for the sake of simplicity, namely:

The regenerator pairs are to reverse at one minute intervals;

The different regenerator pairs are to reverse successively at 20 second intervals;

The total time for a complete cycle is therefore two minutes;

The delay imposed by the relay TDR is eight seconds;

The speed of advance of the camshaft is 90° per minute.

At the start of a cycle (time, $t=0$) the motor is running, the clutch has just been engaged, the switch TS is closed on contact TS2, switches S11, S14, S15, S16 are closed and S12, S13 open, relay R1 is excited and relays R2, R3 are not excited. The cams having been appropriately adjusted on the camshaft, when the latter has advanced through 30° ($t=20$ secs.) switch S12 is closed by cam C2 thus exciting relay R2 causing the second regenerator pair to reverse. When the camshaft has advanced through a further 30° ($t=40$ s.) cam C3 closes switch S13 to excite relay R3 and reverse the third regenerator pair. A further camshaft advance through 30° ($t=1$ m. 0 s.) causes cam C4 to open switch S14 and de-energize relay R1 and thereby reverse the first regenerator pair. Further camshaft advances of 30° ($t=1$ m. 20 s. and $t=1$ m. 40 s.) cause cams C5 and C6 to open switches S15 and S16 and thereby successively de-energize relays R2 and R3 to reverse the second and third regenerators. Finally, when the camshaft has advanced through 168° ($t=1$ m. 52 s.) cam C1 opens switch S11. Since relays R1, R2, R3 are already de-energized, no regenerator reversal takes place, but the clutch engaging coil L is de-energized, thus allowing the clutch E to be disengaged by its spring means and at the same time to throw over switch TS from contact TS2 to contact TS1 to excite the time relay TDR. The spring 155 thereupon returns the camshaft 154 to its initial position and after a delay of eight seconds ($t=2$ m. 0 s.) switch TDS closes to re-excite the coil L, re-engage the clutch, throw over switch TS from contact TS1 to contact TS2, and re-start a new cycle.

The timing mechanism illustrated in FIGURE 12 is not illustrated or described in detail, because it is of a known type. The invention is not concerned with the timing mechanism, as such, but with the application to a heat-treatment, metallurgical furnace, with continuous or step-wise advancement of the charge through successive zones (requiring different regulated atmospheres or/and temperatures) of a multiple regenerator system for heating the combustion air (or oxygen or oxygen-enriched air) in which the reversals of the several pairs of regenerators, associated with different zones of the furnace (through which the charge is successively advanced) are automatically regulated by an electrical switching system operated by an adjustable timing mechanism, which may, in itself, be of a known kind.

Other possible timing mechanisms (within the competence of those skilled in the art) may also be used.

The invention is not limited to the form of construction illustrated and described with reference to the accompanying drawings, but includes all such structural and detail modifications and variants beside those mentioned above as are within the competence of those skilled in the art, without departing from the spirit and scope of the invention as defined in the hereto appended claims. For instance, the invention is not limited to rotary hearth furnaces, but is equally applicable to the so-called "pusher type" furnaces in which the charge is controlled in a straight line through the successive lines of the furnace.

Having thus described the invention, what is claimed as new and desired to be secured by Letters Patent is:

1. A regenerative metallurgical heat treatment furnace fired by combustion of a fuel in air of the continuous type in which the charge is advanced successively through at least two zones in which the temperature and atmosphere are controlled comprising a chamber, means for physically separating said chamber into at least two zones, means for advancing the charge progressively through said zones, a separate pair of regenerators operatively connected with each of said zones for heating the combustion air in the zone with which it is connected, independently controllable valve means for each of said regenerator pairs for regulating the temperature and atmosphere in the zone with which it is connected, reversing valve means operatively connected to each regenerator pair for reversing the direction of flow of fuel and air through the regenerators of the pair, and controlling means for the reversing valve means of the pairs of regenerators comprising an adjustable timing device common to the pairs of regenerators for bringing about the reversals of the pairs of regenerators according to a pre-selected time sequence.

2. A regenerative metallurgical heat treatment furnace as claimed in claim 1 further comprising an exhaust duct connected to each of said zones and mounted on the furnace, inlet means for an oxidant gas connected to each of said zones mounted on the furnace and adapted to be connected to a source of supply of oxidant gas, means for burning a fuel in said oxidant gas, and means including said reversing valve means for causing the oxidant gas to flow from the inlet means through one regenerator and fuel burning means into its zone and the combustion product to flow from its zone through the other regenerator to the exhaust duct, with reversal of flow at intervals.

3. A regenerative metallurgical heat treatment furnace as claimed in claim 1 further comprising independently adjustable means for each of said zones for controlling the temperature and atmosphere therein.

4. A regenerative metallurgical heat treatment furnace as claimed in claim 1 wherein said reversing valve means includes a fluid-pressure actuator, a selector valve therefor and electromagnetic means for operating said selector valve, said adjustable timing device includes an adjustable timing switch device electrically connected to said electromagnetic means associated with each of said zones and operative, according to how it is adjusted, to bring about said flow reversals in the different zones in accordance with the pre-selected time sequence.

5. A regenerative metallurgical heat treatment furnace as claimed in claim 1 further comprising valve means for each of said zones for directing the flow of fuel to the fuel burning means of such zone so as to correspond with the flow of oxidant gas thereto, and means operatively interconnecting said last named valve means with the reversing valve means associated with said zone.

6. A furnace as defined in claim 5, in which each said fuel directing valve means comprises a pair of valves, an electromagnet operative on each such valve, a pair of limit switches respectively controlling the excitation of one and the other of said electromagnets and said reversing valve means includes an element operative to close one and the other of said limit switches alternately according to the position of the reversing valve means.

7. A regenerative metallurgical furnace of the continuous type in which the charge is advanced successively through at least four zones in which the temperature and atmosphere are controlled comprising a working chamber, partition means dividing said chamber into at least four successive zones through which the charge is progressively advanced, said zones including at least one preheating zone, at least two heating zones and at least one soaking zone, a plurality of combustion chambers arranged along each side of and communicating with the working chamber in each zone, means for supplying cold air and fluid fuel to the combination chambers in the preheating zone; and in association with a pair of regenerators associated with each of the heating and soaking zones, cold air inlet means and exhaust outlet means, ducting connecting one regenerator of each pair with the combustion chamber on one side of the associated zone and the other regenerator of the pair with the combustion chambers on the opposite side of said associated zone, reversing valve means for alternately connecting one regenerator of said pair to the said cold air inlet means and the other to said exhaust outlet means, separate means for feeding fluid fuel to the combustion chambers on opposite sides respectively of the working chamber in said associated zone, an "on-off" valve in each such fuel feed means, an electromagnetic device operating each such "on-off" valve, a switch controlling each such electromagnetic device, means actuated by said reversing valve means for actuating said switches alternately in synchronism with the reversals of said reversing valve means, independently controllable means for regulating the ratio of air to fuel supplied to said combustion chamber and the temperature of the combustion products generated in said combustion chambers and injected into said associated zone of the working chamber, and electromagnetic means controlling said reversing valve means, said furnace further comprising a timing switch device controlling all said last named electromagnetic means, said timing switch device being adjustable to bring about reversals of the several said reversing valves in accordance with a pre-selected time sequence including the case in which the several reversals are simultaneous.

8. A furnace as defined in claim 7, further including a pneumatic actuator for actuating each said reversing valve means and a two-position selector valve controlling said actuator, said selector valve being operated by said electromagnetic means.

9. A regenerative metallurgical furnace of the continuous type in which the charge is advanced successively through at least four zones in which the temperature and atmosphere are controlled comprising a working chamber, partition means dividing said chamber into at least four successive zones through which the charge is progressively advanced, said zones including at least one preheating zone, at least two heating zones and at least one soaking zone, a plurality of combustion chambers arranged along each side of and communicating with the working chamber in each zone, means for supplying cold air and fluid fuel to the combustion chambers in the preheating zone; and in association with a pair of regenerators associated with each of the heating and soaking zones, cold air inlet means and exhaust outlet means, ducting connecting one regenerator of each pair with the combustion chamber on one side of the associated zone and the other regenerator of the pair with the combustion chambers on the opposite side of said associated zone, reversing valve means for alternately connecting one regenerator of said pair to the said cold air inlet means and the other to said exhaust outlet means, separate means for feeding fluid fuel to the combustion chambers on opposite sides respectively of the working chamber in said associated zone, an "on-off" valve in each such fuel feed means, an electromagnetic device operating each such "on-off" valve, a switch controlling each such electromagnetic device, means actuated by said reversing valve means for actuating said switches alternately in synchronism with the reversals of said reversing valve means, independently controllable means for regulating the ratio of air to fuel supplied to said combustion chamber and the temperature of the combustion products generated in said combustion chambers and injected into said associated zone of the working chamber, electromagnetic means controlling said reversing valve means, said furnace further comprising a timing switch device controlling all said last named electromagnetic means, said timing switch device being adjustable to bring about reversals of the several said reversing valves in accordance with a pre-selected time sequence including the case in which the several reversals are simultaneous, a pneumatic actuator for actuating each said reversing valve means, a pneumatic relay valve controlling said actuator, and a two-position selector valve controlling said relay valve, said selector valve being operated by said electromagnetic means.

10. A regenerative metallurgical furnace of the continuous type in which the charge is advanced successively through at least four zones in which the temperature and atmosphere are controlled comprising a working chamber, partition means dividing said chamber into at least four successive zones through which the charge is progressively advanced, said zones including at least one preheating zone, at least two heating zones and at least one soaking zone, a plurality of combustion chambers arranged along each side of and communicating with the working chamber in each zone, means for supplying cold air and fluid fuel to the combustion chambers in the preheating zone; and in association with a pair of regenerators associated with each of the heating and soaking zones, cold air inlet means and exhaust outlet means, ducting connecting one regenerator of each pair with the combustion chamber on one side of the associated zone and the other regenerator of the pair with the combustion chambers on the opposite side of said associated zone, reversing valve means for alternately connecting one regenerator of said pair to the said cold air inlet means and the other to said exhaust outlet means, separate means for feeding fluid fuel to the combustion chambers on opposite sides respectively of the working chamber in said associated zone, an "on-off" valve in each such fuel feed means, an electromagnetic device operating each such "on-off" valve, a switch controlling each such electromagnetic device, means actuated by said reversing valve means for actuating said switches alternately in synchronism with the reversals of said reversing valve means, independently controllable means for regulating the ratio of air to fuel supplied to said combustion chamber and the temperature of the combustion products generated in said combustion chambers and injected into said associated zone of the working chamber, and electromagnetic means controlling said reversing valve means, said furnace further comprising a timing switch device controlling all said last named electromagnetic means, said timing switch device being adjustable to bring about reversals of the several said reversing valves in accordance with a pre-selected time sequence including the case in which the several reversals are simultaneous, said timing switch device comprising a cam shaft, means for rotating said cam shaft at a constant predetermined speed, a plurality of cams so adjustably mounted on said cam shaft that their relative rotational positions may be varied, switches actuated by said cams, electrical connections including relays between said switches and the several said reversing valve means controlling electromagnetic means.

References Cited in the file of this patent

UNITED STATES PATENTS

| | | |
|---|---|---|
| 2,069,542 | Soubier | Feb. 2, 1937 |
| 2,843,371 | Fallon | July 15, 1958 |